United States Patent
Ishii

(10) Patent No.: US 7,343,522 B2
(45) Date of Patent: Mar. 11, 2008

(54) APPARATUS HAVING A TRANSFER MODE ABNORMALITY DETECTING FUNCTION, STORAGE CONTROLLING APPARATUS, AND INTERFACE MODULE FOR THE STORAGE CONTROLLING APPARATUS

(75) Inventor: Takanori Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 630 days.

(21) Appl. No.: 10/781,657

(22) Filed: Feb. 20, 2004

(65) Prior Publication Data

US 2005/0044290 A1 Feb. 24, 2005

(30) Foreign Application Priority Data

Aug. 22, 2003 (JP) .............................. 2003-298204

(51) Int. Cl.
  G06F 11/00 (2006.01)
  G06F 11/22 (2006.01)
(52) U.S. Cl. .......................... 714/36; 714/56; 710/313; 709/227
(58) Field of Classification Search ................. 714/56, 714/36; 709/227–229; 710/313–315
See application file for complete search history.

(56) References Cited

U.S. PATENT DOCUMENTS

| | | | | | |
|---|---|---|---|---|---|
| 4,959,847 | A | * | 9/1990 | Engelke et al. ............. | 375/377 |
| 5,457,694 | A | * | 10/1995 | Smith ......................... | 714/712 |
| 5,784,393 | A | * | 7/1998 | Byers et al. ................. | 714/800 |
| 5,884,027 | A | * | 3/1999 | Garbus et al. .............. | 709/250 |
| 6,018,810 | A | * | 1/2000 | Olarig ......................... | 714/43 |
| 6,246,754 | B1 | * | 6/2001 | Cole et al. ................. | 379/93.29 |
| 6,311,296 | B1 | * | 10/2001 | Congdon ....................... | 714/56 |
| 6,389,568 | B1 | * | 5/2002 | Leshay et al. .............. | 714/749 |
| 6,631,483 | B1 | * | 10/2003 | Parrish ........................ | 714/55 |

(Continued)

FOREIGN PATENT DOCUMENTS

JP 61-196353 8/1986
JP 7-98675 4/1995

OTHER PUBLICATIONS

PC Hardware in a Nutshell 3rd Edition by Robert Thompson and Barbara Thompson Published by O'Reilly Jul. 1, 2003.*
Sciforums "TV/Video Capture Card" found at http://www.sciforums.com/TV-Video-Capture-Card-t-1223.html.*

(Continued)

Primary Examiner—Scott Baderman
Assistant Examiner—Joseph Schell
(74) Attorney, Agent, or Firm—Staas & Halsey LLP

(57) ABSTRACT

A storage controlling apparatus controlling an access, for example, from a host to a physical device has a determining means determining whether or not a basic mode predetermined among two or more modes agrees with a mode set in a mode setting sequence run when the apparatus is reset or when data is transferred between modules, and a notifying means determining that transfer mode abnormality occurs when the determining means determines that the two modes do not agree with each other and sending an error notice. Whereby, a data transfer status in a mode differing from the basic mode can be detected as transfer mode abnormality, and the transfer mode abnormality can be solved.

18 Claims, 7 Drawing Sheets

U.S. PATENT DOCUMENTS

| | | | |
|---|---|---|---|
| 6,694,470 B1 * | 2/2004 | Palm | 714/748 |
| 6,754,761 B1 * | 6/2004 | Asaad et al. | 710/311 |
| 6,865,695 B2 * | 3/2005 | Joyner et al. | 714/43 |
| 6,954,712 B2 * | 10/2005 | Bingham et al. | 702/123 |
| 6,954,813 B2 * | 10/2005 | Holley et al. | 710/302 |
| 7,003,701 B2 * | 2/2006 | Ohwada | 714/43 |
| 7,219,220 B2 * | 5/2007 | Cherukuri et al. | 713/2 |

OTHER PUBLICATIONS

PCI Specification Revision 2.3 excerpt of section 3.8.*

Sciforums "TV/Video Capture Card" found at http://www.sciforums.com/TV-Video-Capture-Card-t-1223.html, unknown date.*

PCI Specification Revision 2.3 excerpt of section 3.8, unknown date.*

* cited by examiner

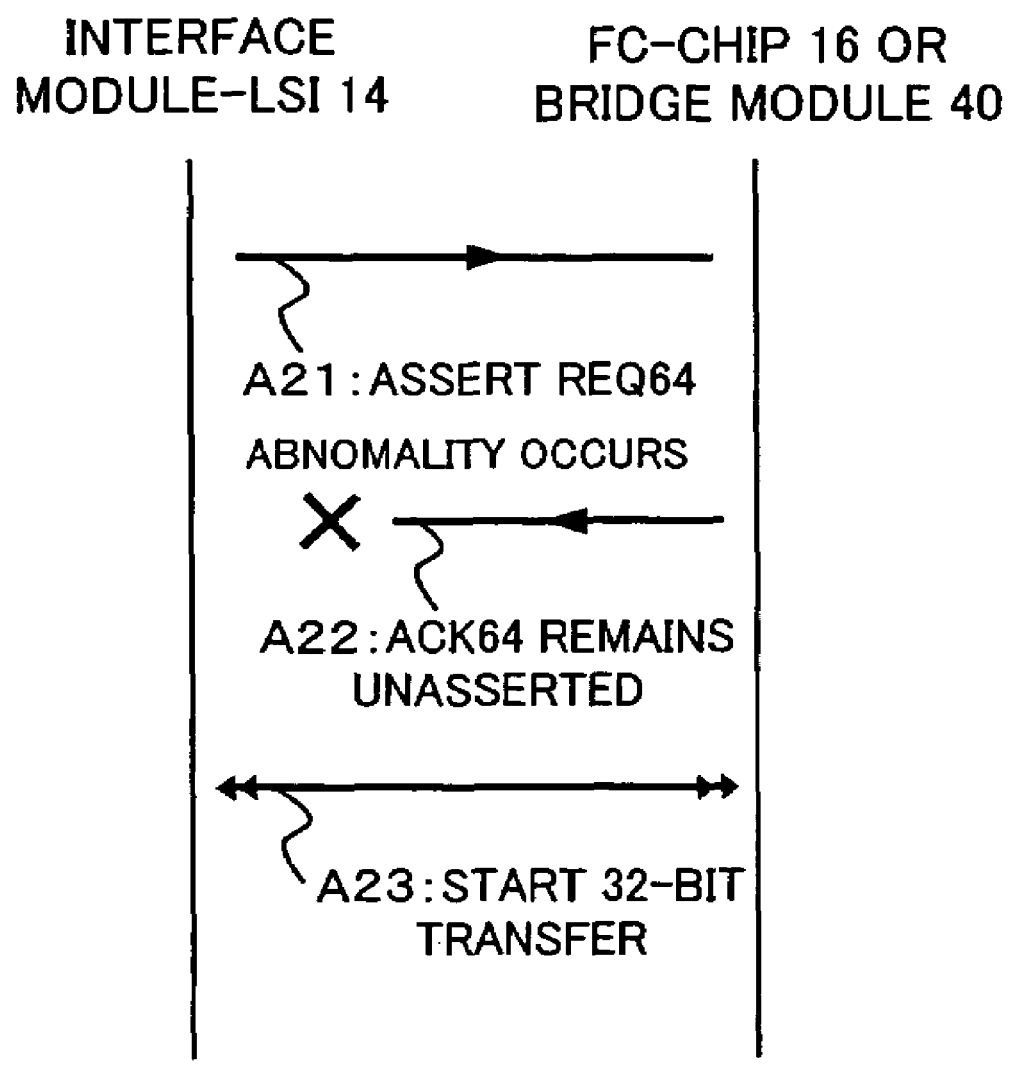

APPARATUS HAVING A TRANSFER MODE ABNORMALITY DETECTING FUNCTION, STORAGE CONTROLLING APPARATUS, AND INTERFACE MODULE FOR THE STORAGE CONTROLLING APPARATUS

BACKGROUND OF THE INVENTION

1) Field of the Invention

The present invention relates to an apparatus which comprises a plurality of modules connected to one another in two or more modes (for example, a 64 bits transfer mode and a 32 bits transfer mode) through interface buses such as PCI (Peripheral Component Interconnect) buses or the like so that data can be transferred among the modules, and has a function of detecting abnormality of the data transfer mode among these modules. More concretely, the present invention is applied to a storage controlling apparatus disposed between a physical device (for example, a magnetic disk unit) and a host to control an access from the host to the physical device, and an interface module (for example, a host interface module or a disk interface module) used in the storage controlling apparatus.

2) Description of the Related Art

FIG. 4 is a block diagram showing a structure of a known storage apparatus (storage controlling apparatus). A storage apparatus 1 shown in FIG. 4 writes data from a server (host), and reads data requested by the server 4 and transfers the data to the server 4 in response to an access from the server 4.

The storage apparatus 1 comprises a disk enclosure 2 having a plurality of disk units (physical devices) 2a, and a storage controlling apparatus 3 disposed between the disk units 2a and the server 4 to control an access from the server 4 to each of the disk units 2a.

The storage controlling apparatus 3 comprises a disk interface module 10, a host interface module 20, a management module 30 and a PCI bridge module 40.

The disk interface module 10 controls an interface (data transfer) with each of the disk units 2a in the disk enclosure 2 through a disk interface bus 54.

The host interface module 20 controls an interface (data transfer) with the server 4 through a fiber channel interface 50.

The management module 30 generally manages the whole of the storage controlling apparatus 3. The management module 30 is equipped with a cache memory temporarily storing data to be written in one of the disk units 2a from the server 4 or data to be read out from one of the disk units 2a to the server 4, and manages the cache memory.

The PCI bridge module 40 is connected thereto the disk interface module 10, the host interface module 20 and the management module 30 through PCI buses (interface buses) 51, 52 and 53 to connect the disk interface module 10, the host interface module 20 and the management module 30 to one another so that data can be transferred among them.

In the above structure, data writing from the server 4 to one of the disk units 2a and data reading from one of the disk units 2a to the server 4 are carried out as follows.

When data is written from the server 4 into one of the disk units 2a in the disk enclosure 2, the data to be written is transferred from the server 4 to the host interface module 20 through the fiber channel interface 50, and temporarily stored in the cache memory of the management module 30 from the host interface module 20 via the PCI bridge module 40 through the PCI buses 52 and 53, (refer to an arrow A1 in FIG. 4). After that, the data to be written stored in the cache memory of the management module 30 is transferred to the disk interface module 10 via the PCI bridge module 40 through the PCI buses 53 and 51, and written in a predetermined disk unit 2a from the disk interface module 10 through the disk interface bus 54 (refer to an arrow A2 in FIG. 4).

Conversely, when data is read out from one of the disk units 2a in the disk enclosure 2 to the server 4, the data to be read out is transferred from a disk unit 2a retaining the data to the disk interface module 10 through the disk interface bus 54, and temporarily stored from the disk interface module 10 in the cache memory of the management module 30 via the PCI bridge module 40 through the PCI buses 51 and 53 (refer to an arrow A3 in FIG. 4). After that, the data to be read out stored in the cache memory of the management module 30 is transferred to the host interface module 20 via the PCI bridge module 40 through the PCI buses 53 and 52, and read out to the server 4 from the host interface module 20 through the fiber channel interface 50 (refer to an arrow A4 in FIG. 4).

Next, description will be made of structures of the disk interface module 10 and the host interface module 20 in the storage controlling apparatus 3 shown in FIG. 4, with reference to a block diagram shown in FIG. 5. The disk interface module 10 and the host interface module 20 have basically the same structure. However, the host interface module 20 differs from the disk interface module 10 in that the host interface module 20 has a function of converting an optical signal from the fiber channel interface 50 into an electric signal and a function of converting an electric signal in the host interface module 10 into an optical signal and sending the optical signal to the fiber channel interface 50, while the disk interface module 10 does not have these functions.

As shown in FIG. 5, each of the disk interface module 10 and the host interface module 20 (hereinafter referred as interface modules 10 and 20, occasionally) comprises a CPU 11, a chip set 12, a memory 13, an interface module-LSI 14, a data buffer 15 and a fiber channel chip 16.

The CPU (Central Processing Unit) 11 fulfils a function of generally managing the interface module 10 or 20.

The chip set 12 has a function of connecting the CPU 11 to another device (for example, the memory 13) and a function of connecting the CPU 11 to the PCI bus 17. The CPU 11 is connected to the memory 13 via the chip set 12, and also connected to the interface module-LSI 14 via the chip set 12 through the PCI bus 17. The memory 13 is configured with, for example, an SDRAM (Synchronous Dynamic Random Access Memory).

The interface module-LSI (Large Scale Integration) 14 functions as a second transferring unit controlling data transfer between the interface module 10 or 20 and the PCI bridge module 40 through the PCI bus 51 or 52 according to an instruction from the CPU 11. The interface module-LSI 14 is provided with the data buffer 15.

The data buffer 15 is configured with, for example, a DDR (Double Data Rate)-SDRAM, which temporarily stores data to be transferred to the PCI bridge module 40 or data transferred from the PCI bridge module 40.

To the interface module-LSI 14, the PCI bridge module 40 is connected through the PCI bus 51 or 52, the chip set 12 is connected through the PCI bus (interface bus) 17, and the fiber channel chip 16 is connected through the PCI bus (interface bus) 18.

The interface module-LSI 14 has a function being as a DMAC (Direct Memory Access Controller). Normally, the CPU 11 runs a predetermined control program to set a descriptor in a DMAC in the interface module-LSI 14 to make the interface module-LSI 14 carry out data transfer.

The fiber channel chip (FC-Chip) 16 functions as a first transfer processing unit controlling data transfer between the interface module 10 or 20 and each of the disk units 2a or the server 4 through the fiber channel interface 50 or the disk interface bus 54.

In a system assumed to carry out large-capacity, high-speed data transfer (wide-band data transfer), a PCI bus having a width of 64 bits is generally used.

In the storage controlling apparatus 3 described above, PCI buses having a width of 64 bits are generally used as the PCI bus 18 connecting the interface module-LSI (module, second transfer processing unit) and the fiber channel chip (module, first transfer processing unit) 16 to each other, the PCI buses 51 and 52 connecting the interface module-LSI 14 and the PCI bridge module 40 to each other, and the PCI bus 53 connecting the management module 30 and the PCI bridge module 40 to each other in order to realize large-capacity, high-speed data transfer (wide-band data transfer). For this, standard chips (LSIs) coping with a width of 64 bits are used as the interface module-LSI 14, the fiber channel chip 16, the management module 30 and the PCI bridge module 40 connected to the PCI buses 51 through 53.

Since the width of 64 bits is expansion of a width of 32 bits in the PCI bus standard, the 64-bit PCI bus can carry out both 64-bit-wide data transfer (64-bit transfer mode) and 32-bit-wide data transfer (32-bit transfer mode). However, a system employing the 64-bit PCI bus is regularly operated in the 64-bit transfer mode, basically, in order to realize large-capacity, high-speed data transfer (wide-band data transfer).

In such the system, a predetermined transfer mode setting sequence (exchange of signals to set the 32-bit transfer mode or the 64-bit transfer mode; refer to FIGS. 6 and 7) is normally run at the time of resetting including the time of power-on or at the time of inter-module data transfer), and the 64-bit transfer mode is set each time.

Next, description will be made of a predetermined transfer mode setting sequence (a normal operation) in the interface module 10 or 20, with reference to a sequence diagram shown in FIG. 6. When the interface module 10 or 20 is reset (including the time of power-on), or when data is transferred between the interface module-LSI 14 and the fiber channel chip 16, or when data is transferred between the interface module-LSI 14 (the interface module 10 or 20) and the PCI bridge module 40, the interface module-LSI 14 asserts an REQ64 signal so that a request to set a connection in the 64-bit transfer mode is notified from the interface module-LSI 14 to the fiber channel chip 16 or the PCI bridge module 40 (refer to an arrow A11), as shown in FIG. 6.

In response to the assertion of the REQ64 signal, the fiber channel chip 16 or the PCI bridge module 40 asserts an ACK64 signal to notify the interface module-LSI 14 that the fiber channel chip 16 or the PCI bridge module 40 confirms the 64-bit transfer mode connection setting request (refer to an arrow A12).

In response to the assertion of the ACK64 signal, data transfer in the 64-bit transfer mode is initiated between the interface module-LSI 14 and the fiber channel chip 16 or the PCI bridge module 40 through the PCI buses 18, or 51 or 52 (refer to an arrow A13).

However, there is a case where the operation timing of a signal in relation to the mode setting sequence is fluctuated due to abnormality of the LSI or the like of the apparatus while the above mode setting sequence is run, and not the 64-bit transfer mode but the 32-bit transfer mode is unusually set. Such situation (an operation of the interface module 10 or 20 performed when abnormality occurs) will be next described with reference to a sequence diagram shown in FIG. 7.

In an example shown in FIG. 7, the interface module-LSI 14 asserts the REQ64 signal so that the request to set a connection in the 64-bit transfer mode is notified from the interface module-LSI 14 to the fiber channel chip 16 or the PCI bridge module 40 (refer to an arrow A21), like the sequence described above with reference to FIG. 6.

When a situation in which the ACK64 signal from the fiber channel chip 16 or the PCI bridge module 40 is not asserted, or the asserted status is not transmitted to the interface module-LSI 14 due to occurrence of abnormality such as a fluctuation in operation timing although the ACK64 signal is asserted occurs (refer to an arrow A22), the ACK64 signal remains unasserted in the interface module-LSI 14. Complying with this, data transfer is initiated not in the 64-bit transfer mode but in the 32-bit transfer mode between the interface module-LSI 14, and the fiber channel chip 16 or the PCI bridge module 40 through the PCI buses 18, or 51 or 52 (refer to an arrow A23).

Even though data transfer is carried out in not the 64-bit transfer mode but the 32-bit transfer mode, no problem in the specifications occurs in a system in the present condition. For this, the system does not have a means of detecting such the condition (ineffective data transfer status), thus such the condition cannot be detected or remains unsolved. Japanese Patent Laid-Open Publication No. 61-196353 and Japanese Patent Laid-Open Publication No. 7-98675 disclose inventions relating to bus expansion, both of which cannot detect or solve the situation (ineffective data transfer status) described above with reference to FIG. 7.

When data transfer in the 32-bit transfer mode is executed as above, the transfer width is decreased so that the internal throughput and the processing performance are degraded in the system. There is thus a demand to detect and solve the above ineffective data transfer status when such the status occurs.

SUMMARY OF THE INVENTION

In light of the above problem, an object of the present invention is to detect a data transfer status in a mode (for example, an inefficient data transfer status due to the 32-bit transfer mode) differing from a basic mode (for example, the 64-bit transfer mode) as transfer mode abnormality, and solve it without specifically adding to or/and changing the hardware, whereby degradation of the processing performance of the system is certainly prevented.

Therefore, the present invention provides an apparatus having a transfer mode abnormality detecting function comprising at least two modules connected to each other through an interface bus in at least two different modes so that data can be transferred between the modules, a determining means for determining whether or not a basic mode predetermined between the at least two different modes agrees with a mode set in a mode setting sequence executed when the apparatus is reset or when data is transferred between the modules, and a notifying means for determining that transfer mode abnormality occurs when the determining means determines that the modes do not agree with each other, and for notifying of an error notice.

The present invention further provides a storage controlling apparatus disposed between a disk unit and a host to control an access from the host to the unit, the storage controlling apparatus comprising a disk interface module for controlling an interface with the disk unit, a host interface module for controlling an interface with the host, a management module for generally managing the whole of the apparatus, a bridge module connected the disk interface module, the host interface module and the management module through interface buses to connect the aid disk interface module, the host interface module and the management module to one another so that data can be transferred among the disk interface module, the host interface module and the management module, the disk interface module, the host interface module, the management module and the bridge module being connected in at least two different modes so that data can be transferred among the disk interface module, the host interface module, the management module and the bridge module, a determining means for determining whether or not a basic mode predetermined between the at least two different modes agrees with a mode set in a mode setting sequence executed when the storage controlling apparatus is reset or when data is transferred among the modules, and a notifying means for determining that transfer mode abnormality occurs when the determining means determines that the modes do not agree with each other, and for notifying of an error notice.

The present invention still further provides an interface module for a storage controlling apparatus disposed between a disk unit and a host to control an access from the host to the disk unit, the storage controlling apparatus comprising the interface module for controlling an interface with the disk unit or the host, a management module for generally managing the whole of the storage controlling apparatus, and a bridge module for connecting the interface module and the management module so that data can be transferred between the interface module and the management module to each other, the interface module comprising a first transfer processing unit for controlling data transfer between the interface module and the disk unit or the host, a second transfer processing unit for controlling data transfer between the interface module and the bridge module, the two transfer processing units being connected to each other in at least two different modes through an interface bus so that data can be transferred between the two transfer processing units, a determining means for determining whether or not a basic mode predetermined between the at least two different modes agrees with a mode set in a mode setting sequence executed when the interface module is reset or when data is transferred between the two transfer processing units, and a notifying means for determining that transfer mode abnormality occurs when the determining means determines that the modes do not agree with each other, and for notifying of an error notice.

Each of the apparatus having a transfer mode abnormality detecting function, the storage controlling apparatus and the interface module for the apparatus described above may further comprise a controlling means for rerunning the mode setting sequence in response to the error notice from the notifying means. At this time, when the determining means again determines that the modes do not agree with each other after the controlling means reruns the mode setting sequence, the notifying means may determine that a failure occurs and notify of a failure notice.

The determining means may determine that the modes do not agree with each other when a confirmation signal responding to the basic mode remains disabled at the time of executing the mode setting sequence.

The interface bus may be a PCI (Peripheral Component Interconnect) bus. The interface bus may be a 64-bit PCI bus, the at least two different modes may be a 64-bit transfer mode and a 32-bit transfer mode, the basic mode may be the 64-bit transfer mode, and when the determining means determines that the modes do not agree with each other, the notifying means may determine that an inefficient transfer status occurs as the transfer mode abnormality, and notify of the error notice.

According to this invention, in each of the apparatus having a transfer mode abnormality detecting function, the storage controlling apparatus and the interface for the apparatus, it is determined whether a basic mode (for example, a 64-bit transfer mode) predetermined between at least two different modes agrees with a mode set in a mode setting sequence rerun at the time of resetting or data transfer between modules (or transfer processing units). When the two modes do not agree with each other, it is determined that transfer mode abnormality occurs, and an error notice is notified. It is thereby possible to certainly solve transfer mode abnormality such as an inefficient data transfer status due to, for example, the 32-bit transfer mode, and certain prevent degradation of the processing performance of the system.

BRIEF DESCRIPTION OF THE DRAWINGS

FIG. 7 is a sequence diagram for illustrating an operation of the known interface module for a storage controlling apparatus at the time of abnormal data transfer.

DESCRIPTION OF THE PREFERRED EMBODIMENTS

Hereinafter, description will be made of an embodiment of the present invention with reference to the drawings.

Figure 4:
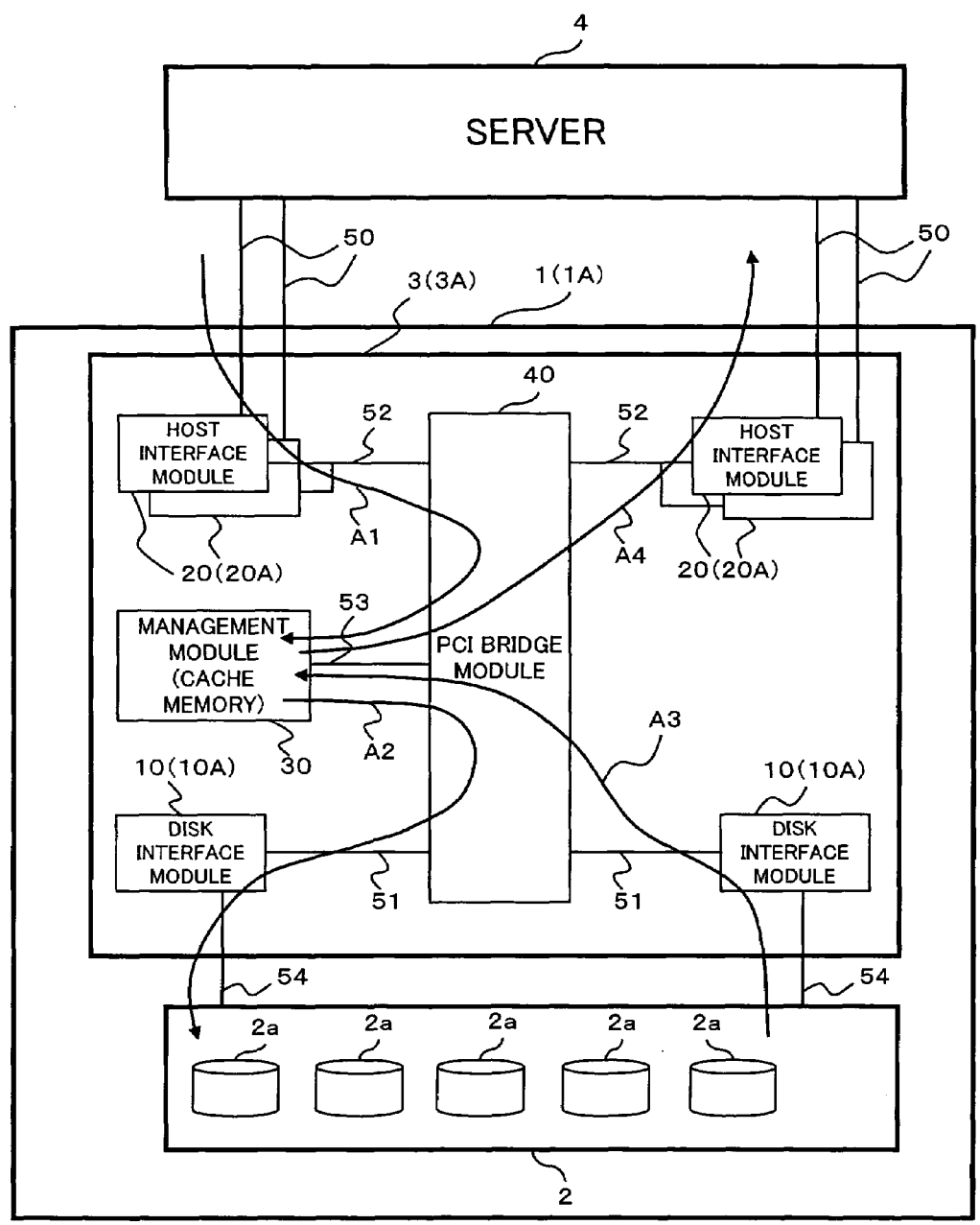
FIG. 4 is a block diagram showing a structure of both a known storage apparatus (storage controlling apparatus) and a storage apparatus (storage controlling apparatus) according to the embodiment of this invention.
Figure 5:
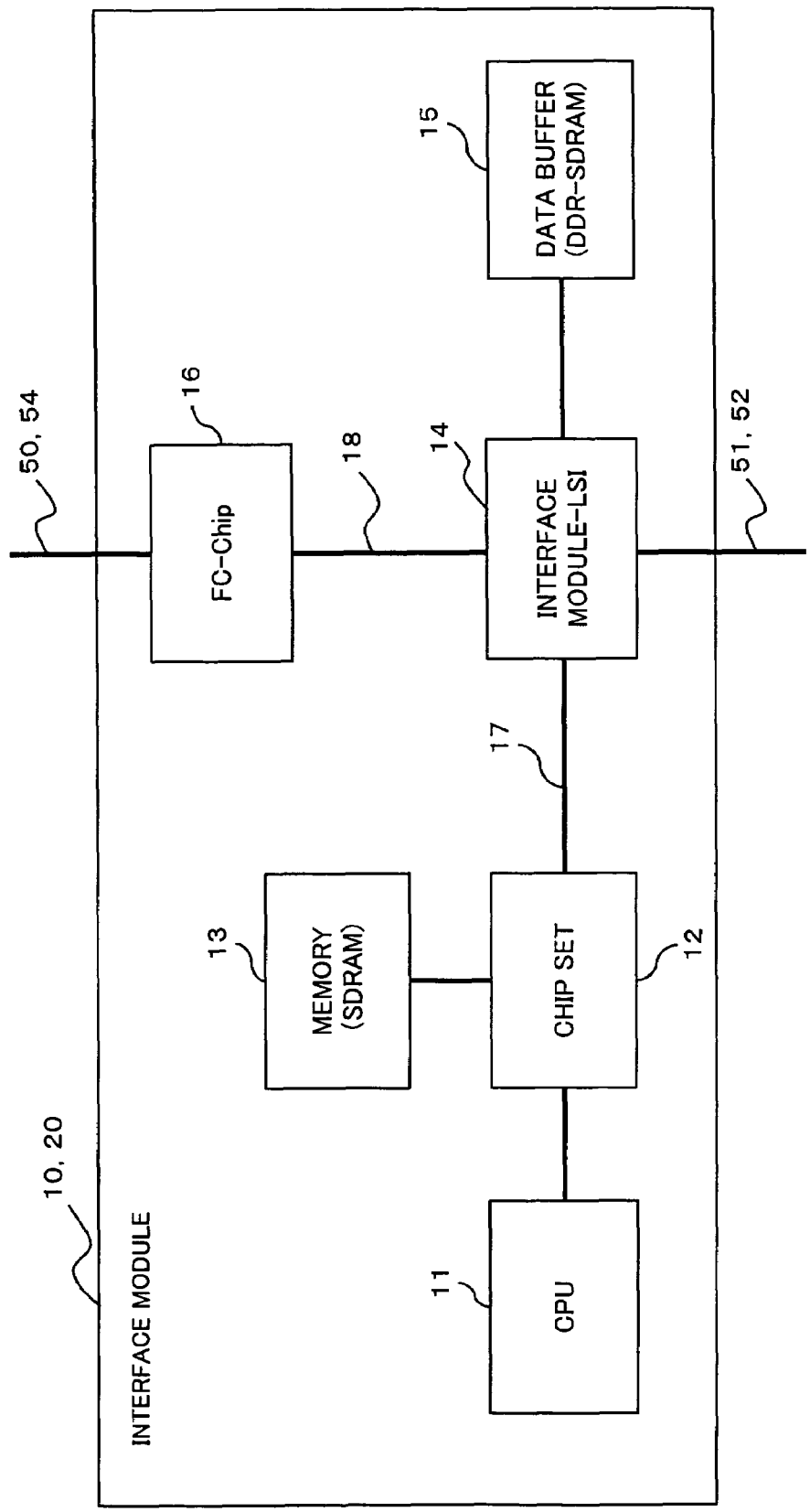
FIG. 5 is a block diagram showing a structure of a known interface module for a storage controlling apparatus.

A storage apparatus 1A according to an embodiment of this invention basically has almost the same structure as the known storage apparatus 1, as shown in FIG. 4. The storage apparatus 1A according to this embodiment writes data from a server 4, and reads out data requested by the server 4 and transfers the data to the server 4 in response to an access from the server (host) 4. The storage apparatus 1A comprises a disk enclosure 2 having a plurality of disk units (physical devices), and a storage controlling apparatus 3A disposed between the disk units 2a and the server 4 to control an access to each of the disk units 2a from the server 4.

Almost similar to the known storage controlling apparatus 3, the storage apparatus 3A according to this embodiment basically comprises, as shown in FIG. 4, a disk interface module 10A, a host interface module 20A, a management module 30 and a PCI bridge module 40A.

The disk interface module (module) 10A controls an interface (data transfer) with each of the disk units 2a in the disk enclosure 2 through a disk interface bus 54.

The host interface module (module) 20A controls an interface (data transfer) with the server 4 through a fiber channel interface 50.

The management module (module) 30 generally manages the whole of the storage controlling apparatus 3A. The management module 30 is equipped with a cache memory temporarily storing data to be written in one of the disk units 2a from the server 4 or data to be read out from each of the disk units 2a to the server 4, and manages the cache memory.

The PCI bridge module (bridge module) 40 is connected thereto the disk interface module 10A, the host interface module 20A and the management module 30 through PCI buses (interface buses) 51, 52 and 53 to connect the disk interface module 10A, the host interface module 20A and the management module 30 to one another so that data can be transferred among them.

In the storage controlling apparatus 3A with the above structure according to this embodiment, data writing from the server 4 into one of the disk units 2a and data reading from one of the disk units 2a to the server 4 are carried out in a procedure (refer to arrow A1 through A4 in FIG. 4) similar to that carried out in the storage controlling apparatus 3 described hereinbefore.

Next, description will be made of structures of the disk interface module 10A and the host interface module 20A in the storage controlling apparatus 3A according to this embodiment, with reference to a block diagram shown in FIG. 1. The disk interface module 10A and the host interface module 20A have basically the same structure. However, the host interface module 20A differs from the disk interface module 10A in that the host interface module 20A has a function of converting an optical signal from the fiber channel interface 50 into an electric signal and a function of converting an electric signal in the host interface module 20A into an optical signal and sending the optical signal to the fiber channel interface 50, while the disk interface module 10A does not have these functions.

Figure 1:
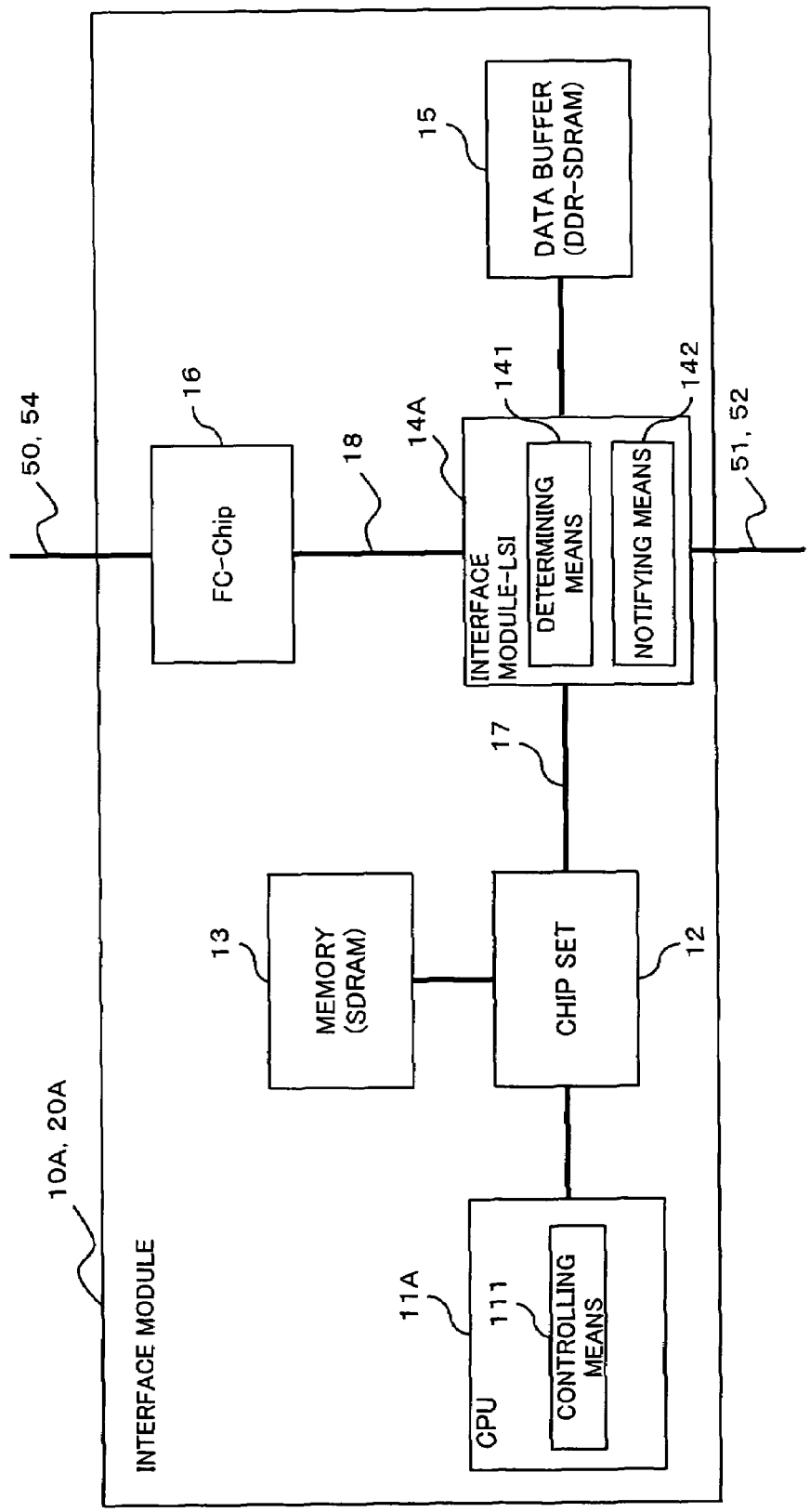
FIG. 1 is a block diagram showing a structure of an interface module for a storage controlling apparatus according to an embodiment of this invention.

As shown in FIG. 1, each of the disk interface module 10A and the host interface module 20A (hereinafter simply referred as interface modules 10A and 20A, occasionally) comprises a CPU 11A, a chip set 12, a memory 13, an interface module-LSI 14A, a data buffer 15 and a fiber channel chip 16.

The CPU (Central Processing Unit) 11A fulfils a function of generally managing the interface module 10A or 20A. According to this embodiment, the CPU also fulfils a function as a controlling means 111 to be described later.

The chip set 12 has a function of connecting the CPU 11A to another device (for example, the memory 13) and a function of connecting the CPU 11A to the PCI bus 17. The CPU 11A is connected to the memory 13 via the chip set 12, and also connected to the interface module-LSI 14A via the chip set 12 through the PCI bus 17. The memory 13 is configured with, for example, an SDRAM (Synchronous Dynamic Random Access Memory).

The interface module-LSI (Large Scale Integration; module) 14A functions as a second transfer processing unit controlling data transfer between the interface module 10A or 20A and the PCI bridge module 40 through the PCI bus 51 or 52 according to an instruction from the CPU 11A. The interface module-LSI 14A is provided with the data buffer 15. The data buffer 15 is configured with, for example, a DDR (Double Data Rate)-SDRAM, which temporarily stores data to be transferred to the PCI bridge module 40 or data transferred from the PCI bridge module 40.

To the interface module-LSI 14A, the PCI bridge module 40 is connected through the PCI bus 51 or 52, the chip set 12 is connected through the PCI bus (interface bus) 17, and the fiber channel chip 16 is connected through the PCI bus (interface bus) 18.

The interface module-LSI 14A according to this embodiment has functions being as a determining means 141 and a notifying means 142 to be described later.

The fiber channel chip (FC-Chip; module) 16 functions as a first transfer processing unit controlling data transfer between the interface module 10A or 20A and each of the disk units 2a or the server 4 through the fiber channel interface 50 or the disk interface bus 54.

In the storage controlling apparatus 3A according to this embodiment, buses having a width of 64 bits are used as the PCI bus 18 connecting the interface module-LSI 14 and the fiber channel chip 16 to each other, the PCI buses 51 and 52 connecting the interface module-LSI 14A (interface module 10A or 20A) and the PCI bridge module 40 to each other, and the PCI bus 53 connecting the management module 30 and the PCI bridge module 40 to each other.

Through the PCI buses 18, and 51 through 53, it is possible to carry out data transfer in two different modes, that is, data transfer of a width of 64 bits (64-bit transfer mode) and data transfer of a width of 32 bits (32-bit transfer mode). For this, standard chips (LSIs) coping with the width of 64 bits are used as the interface module-LSI 14A, the fiber channel chip 16, and management module 30 and the PCI bridge module 40 connected to the PCI buses 18, and 51 through 53.

According to this embodiment, the 64-bit transfer mode is predetermined as the basic mode so that the storage controlling apparatus 3A is basically operated in the 64-bit transfer mode at any time, in order to realize large-capacity, high-speed data transfer (wide-band data transfer).

Figure 2:
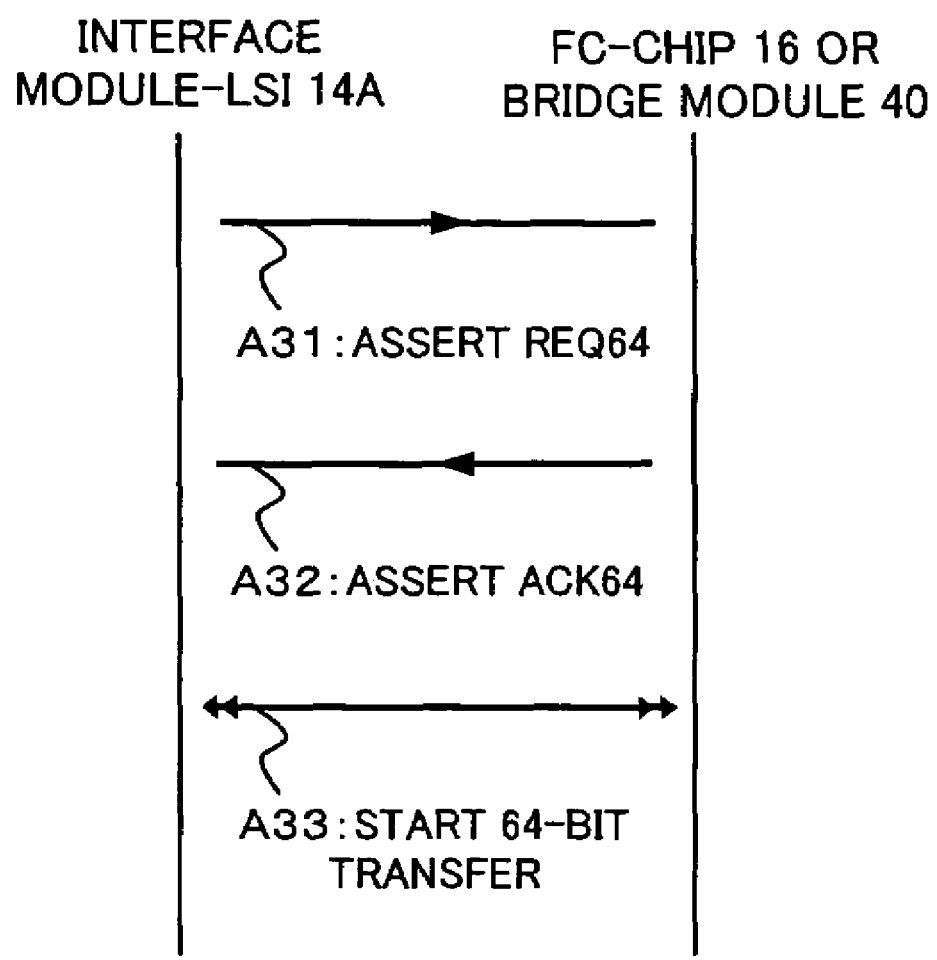
FIG. 2 is a sequence diagram for illustrating an operation of the interface module for a storage controlling apparatus at the time of normal data transfer according to the embodiment of this invention.
Figure 3:
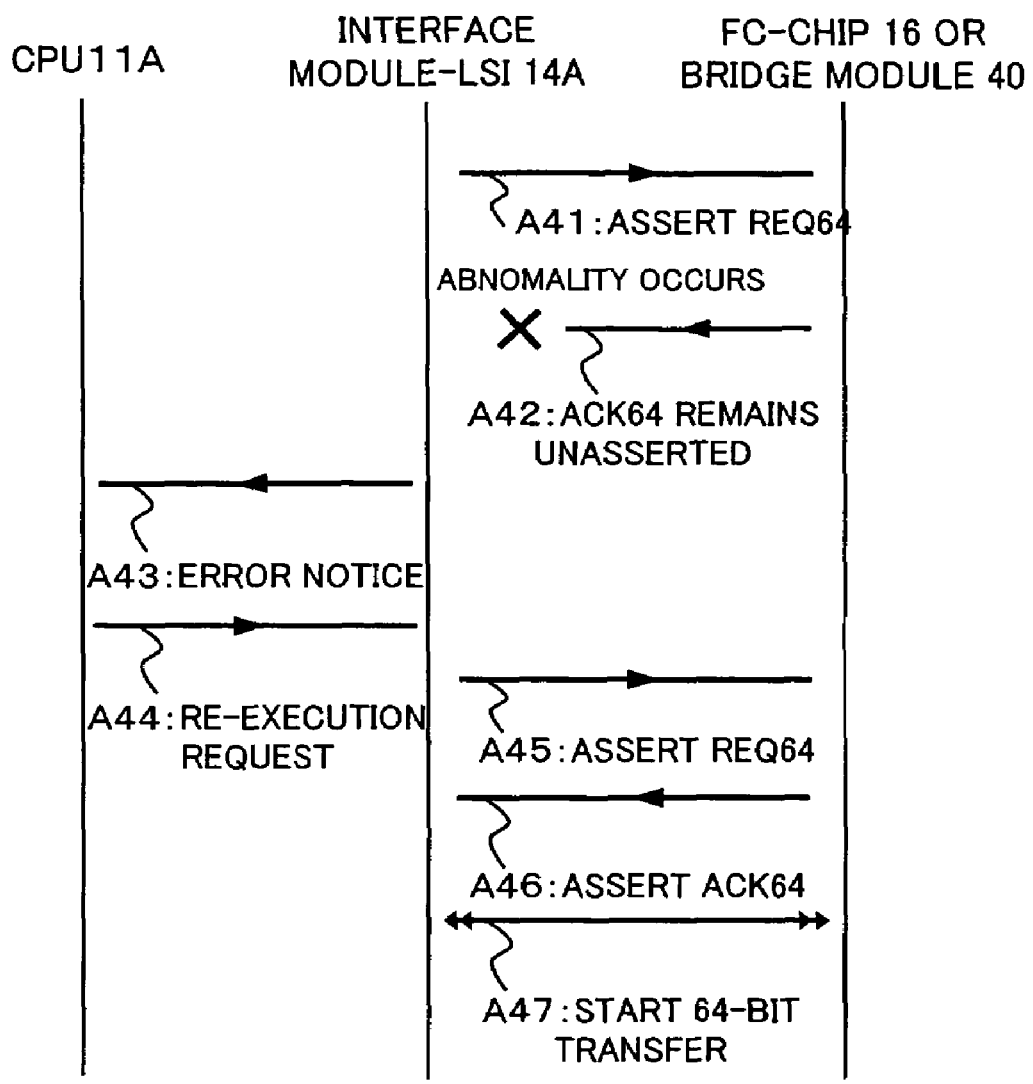
FIG. 3 is a sequence diagram for illustrating an operation of the interface module for a storage controlling apparatus at the time of abnormal data transfer.

According to this embodiment, when the interface module 10A or 20A, or the storage controlling apparatus 3A is reset (including the time of power-on), or when data transfer between the modules (for example, between the fiber channel chip 16 and the interface module-LSI 14A, or between the interface module-LSI 14A and the PCI bridge module 40) is initiated, a predetermined transfer mode setting sequence (exchange of signals to set the 32-bit transfer mode or the 64-bit transfer mode; refer to FIGS. 2 and 3) is run, and the 64-bit transfer mode is set each time.

The determining means 141 in the interface module-LSI 14A determines whether or not the above basic mode (64-bit transfer mode) agrees with a mode set in the above mode setting sequence.

Practically, the determining means 141 monitors an ACK64 signal (confirmation signal) from the interface module-LSI 14A or the PCI bridge module 40, which is to be asserted in response to assertion (enabling) of a REQ64 signal of the interface module-LSI 14A when the mode setting sequence is run. When the ACK64 signal is asserted, the determining means 141 determines that the two modes agree with each other. When the ACK64 signal remains unasserted [for example, the ACK64 signal remains in the unasserted status (in a status where the confirmation signal is not enabled) even when a predetermined time has elapsed], the determining means 141 determines that the two modes do not agree with each other.

When the determining means 141 determines that the two modes do not agree with each other, the notifying means 142 in the interface module-LSI 14A determines that the ineffective transfer status occurs due to the 32-bit transfer mode as transfer mode abnormality, and notifies the CPU 11A of an error notice via the chip set 12 through the PCI bus 17.

When receiving the above error notice from the notifying means 142 in the interface module-LSI 14A, the controlling means 111 in the CPU 11A functions to make the interface module-LSI 14A rerun the mode setting sequence.

According to this invention, when the determining means 141 again determines that the two modes do not agree with each other after the controlling means 111 makes the interface module-LSI 114A rerun the mode setting sequence, the notifying means 142 determines that a failure occurs, and notifies the CPU 11A of a failure notice via the chip set 12 through the PCI bus 17.

Incidentally, the above functions of the controlling means 111, the determining means 141 and the notifying means 142 are accomplished by running a predetermined program by the CPU 11A or the interface module-LSI 14A. This program is provided in a form in which the program is recorded on a computer readable record medium such as a flexible disk, a CD-ROM, a CD-R, a CD-RW, a DVD or the like. Therefore, the functions (the storage controlling apparatus 3A, and the interface modules 10A and 20A) according to this invention are accomplished only by changing the software without specifically adding to or changing the hardware of the known apparatus.

Next, detailed description will be made of operations of the storage controlling apparatus 3A (the interface module 10A or 20A) structured as above according to this embodiment, with reference to FIGS. 2 and 3.

Figure 6:
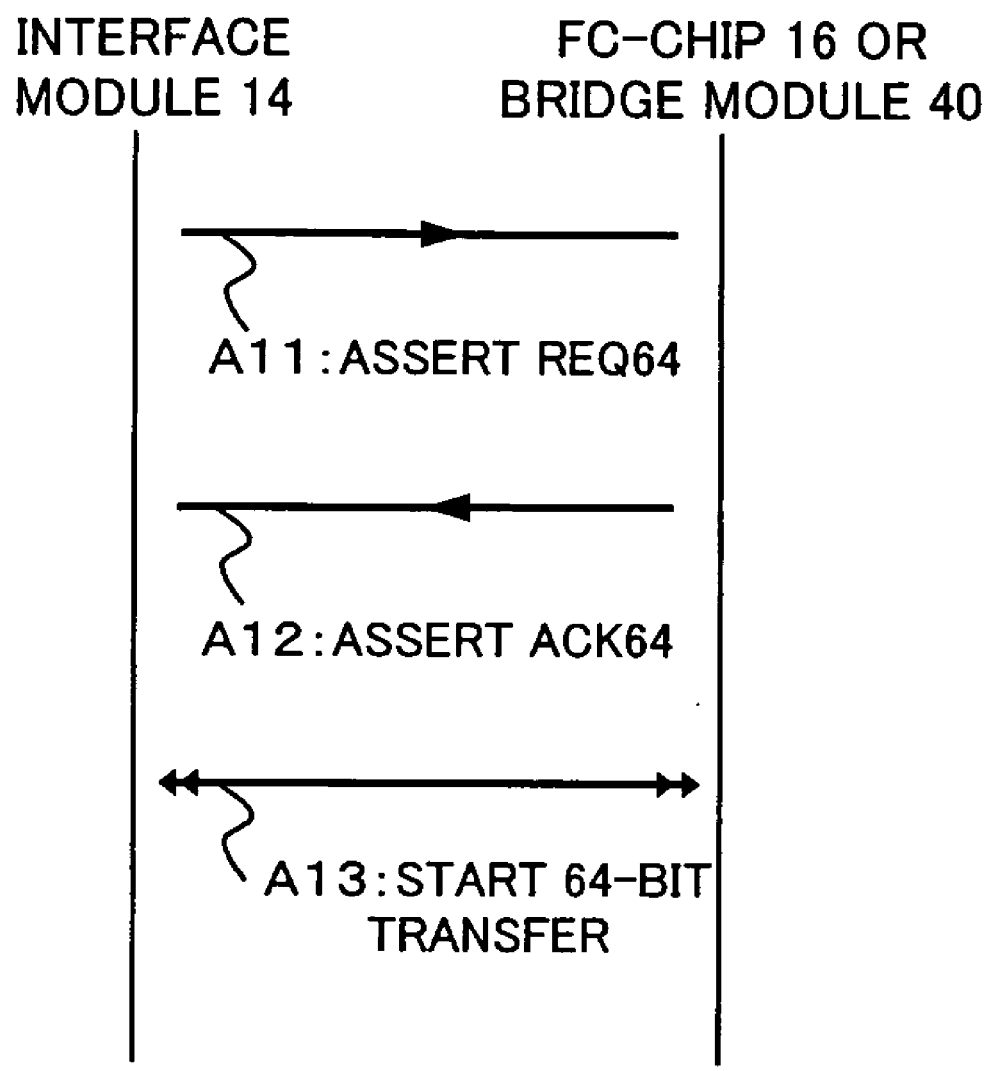
FIG. 6 is a sequence diagram for illustrating an operation of the known interface module for a storage controlling apparatus at the time of normal data transfer.

First, the predetermined transfer mode setting sequence (operation at the time of normal transfer) in the interface module 10A or 20A will be described with reference to a sequence diagram shown in FIG. 2. Like the known procedure shown in FIG. 6, when the storage controlling apparatus 3A (interface module 10A or 20A) is reset, or when data transfer between the interface module-LSI 14A and the fiber channel chip 16 is initiated, or when data transfer between the interface module-LSI 14A (interface module 10A or 20A) and the PCI bridge module 40 is initiated, the interface module-LSI 14A enables (asserts) the REQ64 signal, whereby a request to set a connection in the 64-bit transfer mode is notified from the interface module-LSI 14A to the fiber channel chip 16 or the PCI bridge module 40, as shown in FIG. 2 (refer to an arrow A31).

In response to the assertion of the REQ64 signal, the fiber channel chip 16 or the PCI bridge module 40 enables (asserts) the ACK64 signal, whereby the fiber channel chip 16 or the CPI bridge module 40 notifies the interface module-LSI 14A that the fiber channel chip 16 or the CPI bridge module 40 confirms the 64-bit transfer mode connection setting request (refer to an arrow A32).

When the ACK64 signal is asserted as above, the determining means 141 in the interface module-LSI 14A according to this embodiment determines that the 64-bit transfer mode, which is the basic mode, agrees with a mode set in the mode setting sequence, and the interface module-LSI 14A continues the normal operation without an operation of the notifying means 142. Namely, in response to the assertion of the ACK64 signal, data transfer in the 64-bit transfer mode is initiated between the interface module-LSI 14A and the fiber channel chip 16 or the PCI bridge module 40 through the PCI buses 18, or 51 or 52 (refer to an arrow A33).

Next, description will be made of a case where the operation timing of the signals relating to the mode setting sequence fluctuates due to abnormality of the LSI or the like of the apparatus while the mode setting sequence is run, and not the 64-bit transfer mode but the 32-bit transfer mode is set (the operation of the interface module 10A or 20A at the time of occurrence of abnormality), with reference to a sequence diagram shown in FIG. 3.

In an example shown in FIG. 3, the interface module-LSI 14A asserts the REQ64 signal, whereby a request to set a connection in the 64-bit transfer mode is notified from the interface module-LSI 14A to the fiber channel chip 16 or the PCI bridge module 40 (refer to an arrow A41), in a similar way to the sequence described above with reference to FIG. 2.

After that, when there occurs a situation in which the ACK64 signal from the fiber channel chip 16 or the PCI bridge module 40 is not asserted or the assertion status of the ACK64 signal is not transmitted to the interface module-LSI 14A due to occurrence of abnormality such as fluctuation in operation timing or the like although the ACK64 signal is asserted (refer to an arrow A42), the ACK64 signal remains unasserted in the interface module-LSI 14A.

When the ACK64 signal remains unasserted, the determining means 141 in the interface module-LSI 14A according to this embodiment determines that the 64-bit transfer mode, which is the basic mode, does not agree with a mode set in the mode setting sequence, and the notifying means 142 in the interface module-LSI 14A determines that the inefficient transfer status due to the 32-bit transfer mode occurs as abnormality of the transfer mode, and notifies the CPU 11A of an error notice via the chip set 12 through the PCI bus 17 (refer to an arrow A43).

When the CPU 11A receives the error notice from the notifying means 142 in the interface module-LSI 14A, the controlling means 111 requests the interface module-LSI 14A via the chip set 12 through the PCI bus 17 to rerun the mode setting sequence so that the mode setting sequence is rerun by the interface module-LSI 14A (refer to an arrow A44)

In response to the rerunning request, the interface module-LSI 14A again asserts the REQ64 signal, whereby the 64-bit transfer mode connection setting request is notified from the interface module-LSI 14A to the fiber channel chip 16 or the PCI bridge module 40 (refer to an arrow A45).

In response to this, the 32-bit transfer mode is restored to the 64-bit transfer mode. When the ACK 64 signal from the fiber channel chip 16 or the PCI bridge module 40 is asserted (refer to an arrow A46), the determining means 141 in the interface module-LSI 14A determines that the 64-bit transfer mode, which is the basic mode, agrees with the mode set in the mode setting sequence.

Whereby, data transfer in the 64-bit transfer mode is initiated between the interface module-LSI 14A and the fiber channel chip 16 or the PCI bridge module 40 through the PCI buses 18, or 51 or 52 (refer to an arrow A47).

When the 32-bit transfer mode is not restored to the 64-bit transfer mode and the ACK64 signal from the fiber channel chip 16 or the PCI bridge module 40 remains unasserted even though the 64-bit transfer mode connection setting request is made in response to the above rerunning request (refer to an arrow A44), the notifying means 142 in the interface module-LSI 14A determines that a failure occurs, and notifies the CPU 11A of a failure notice via the chip set 12 through the PCI bus 17. The CPU 11A takes measures [interruption of the process, a failure notice to the outside (operator or the like)] to deal with the failure.

In the storage controlling apparatus 3A and the interface module 10A or 20A according to the embodiment of this invention, agreement/disagreement of the 64-bit transfer mode, which is the basic mode, with a mode set in the mode setting sequence run at the time of reset or start of data transfer is determined by the determining means 141, and when it is determined that the two modes do not agree with each other, it is determined that the transfer mode abnormality occurs, and an error notice is sent to the CPU 11A.

In response to the error notice, the CPU 11A can certainly solve the transfer mode abnormality such as an inefficient data transfer status due to, for example, the 32-bit transfer mode by means of the function or the like of the controlling means 111, thereby to certainly prevent degradation of the processing performance of the storage controlling apparatus 3A.

Note that the present invention is not limited to the above embodiment, but may be modified in various ways without departing from the scope of the invention.

In the above embodiment, this invention is applied to the storage controlling apparatus or the interface module for the apparatus. However, this invention is not limited to this. This invention can be applied to an apparatus so long as the apparatus comprises two or more modules connected to each other/one another in two or more different modes through interface buses such as the PCI buses or the like so that data can be transferred between/among the modules like the above embodiment, and can bring the same functions and effects as the above embodiment.

In the above embodiment, abnormality of transfer mode between the fiber channel chip 16 and the interface module-LSI 14A or between the interface module-LSI 14A and the PCI bridge module 40 is detected. However, this invention is not limited to this. This invention can be applied when abnormality of transfer mode between the management module 30 and the PCI bridge module 40 is detected, like the above embodiment. In which case, the management module 30 or the PCI bridge module 40 has functions being as the determining means 141, the notifying means 142 and the controlling means 111 described above, whereby the same functions and effects as those provided in the above embodiment can be obtained.

Further, in the above embodiment, the two different modes in which abnormality occurs are the 32-bit transfer mode and the 64-bit transfer mode of the PCI bus, or the ineffective transfer status due to the 32-bit transfer mode is detected as transfer mode abnormality. However, this invention is not limited to this.

In the above embodiment, the notifying means 142 in the interface module-LSI 14A informs the CPU 11A of an error notice or a failure notice. However, the notifying means 142 may inform the outside (operator or the like) of it. In which case, the operator or the like having received the error notice or the failure notice carries out the restoring operation to restore the 32-bit transfer mode to the 64-bit transfer mode, or the failure restoring operation.

In the above embodiment, the interface between the server 4 and the storage controlling apparatus 3A is a fiber channel interface, but this invention is not limited to this.

According to this invention, transfer mode abnormality is detected, and the error notice is sent. It is thus possible to certainly solve the transfer mode abnormality such as an ineffective data transfer mode status due to, for example, the 32-bit transfer mode in response to the error notice, and to prevent degradation of the processing performance of the system.

This invention is suitable for use in a storage controlling apparatus controlling an access to a physical device (a magnetic disk unit or the like) from a host, or an interface module for the apparatus, the versatility of this invention is thus extremely large.

The present invention is not limited to the embodiment specifically described above, and variations and modifications can be made without departing from the scope of the present invention.

What is claimed is:

1. An apparatus having a transfer mode abnormality detecting function comprising:
    at least two modules connected to each other through an interface bus in at least two different modes so that data can be transferred between said modules;
    a determining means for determining whether or not a basic mode predetermined to be one of said at least two different modes agrees with a mode set in a mode setting sequence executed when said apparatus is reset or when data is transferred between said modules;
    a notifying means for determining that transfer mode abnormality occurs when said determining means determines that said modes do not agree with each other, and for sending an error notice; and
    a controlling means for rerunning said mode setting sequence in response to said error notice from said notifying means.

2. The apparatus having a transfer mode abnormality detecting function according to claim 1, wherein when said determining means again determines that said modes do not agree with each other after said controlling means reruns said mode setting sequence, said notifying means determines that a failure occurs and sends a failure notice.

3. The apparatus having a transfer mode abnormality detecting function according to claim 2, wherein said interface bus is a PCI (Peripheral Component Interconnect) bus.

4. The apparatus having a transfer mode abnormality detecting function according to claim 3, wherein said interface bus is a 64-bit PCI bus, said at least two different modes are a 64-bit transfer mode and a 32-bit transfer mode, said basic mode is said 64-bit transfer mode; and
    when said determining means determines that said modes do not agree with each other, said notifying means determines that an inefficient transfer status occurs as said transfer mode abnormality, and sends said error notice.

5. The apparatus having a transfer mode abnormality detecting function according to claim 1, wherein said interface bus is a PCI (Peripheral Component Interconnect) bus.

6. The apparatus having a transfer mode abnormality detecting function according to claim 5, wherein said interface bus is a 64-bit PCI bus, said at least two different modes are a 64-bit transfer mode and a 32-bit transfer mode, said basic mode is said 64-bit transfer mode; and
    when said determining means determines that said modes do not agree with each other, said notifying means determines that an inefficient transfer status occurs as said transfer mode abnormality, and sends said error notice.

7. A storage controlling apparatus disposed between a disk unit and a host to control an access from said host to said unit, said storage controlling apparatus comprising:
    a disk interface module for controlling an interface with said disk unit;
    a host interface module for controlling an interface with said host;
    a management module for generally managing the whole of said apparatus;
    a bridge module connected to said disk interface module, said host interface module and said management module through interface buses; said bridge module connecting said disk interface module, said host interface module and said management module to one another so that data can be transferred among said disk interface module, said hose interface module and said management module;

said disk interface module, said host interface module, said management module and said bridge module being connected in at least two different modes so that data can be transferred among said disk interface module, said host interface module, said management module and said bridge module;

a determining means for determining whether of not a basic mode predetermined to be one of said at least two different modes agrees with a mode set in a mode setting sequence executed when said storage controlling apparatus is reset or when data is transferred among said modules;

a notifying means for determining that transfer mode abnormality occurs when said determining means determines that said modes do not agree with each other, and for sending an error notice; and a controlling means for rerunning said mode setting sequence when receiving said error notice from said notifying means.

8. The storage controlling apparatus according to claim 7, wherein when said determining means again determines that said modes do not agree with each other after said controlling means reruns said mode setting sequence, said notifying means determines that a failure occurs and sends a failure notice.

9. The storage controlling apparatus according to claim 8, wherein said interface buses are PCI (Peripheral Component Interconnect) buses.

10. The storage controlling apparatus according to claim 9, wherein said interface buses are 64-bit PCI buses, said at least two different modes are a 64-bit transfer mode and a 32-bit transfer mode, said basic mode is said 64-bit transfer mode; and when said determining means determines that said modes do not agree with each other, said notifying means determines that an inefficient transfer status occurs as said transfer mode abnormality, and sends said error notice.

11. The storage controlling apparatus according to claim 7, wherein said interface buses are PCI (Peripheral Component Interconnect) buses.

12. The storage controlling apparatus according to claim 11, wherein said interface buses are 64-bit PCI buses, said at least two different modes are a 64-bit transfer mode and a 32-bit transfer mode, said basic mode is said 64-bit transfer mode; and when said determining means determines that said modes do not agree with each other, said notifying means determines that an inefficient transfer status occurs as said transfer mode abnormality, and sends said error notice.

13. An interface module for a storage controlling apparatus disposed between a disk unit and a host to control an access from said host to said disk unit, said storage controlling apparatus comprising said interface module for controlling an interface with said disk unit or said host, a management module for generally managing the whole of said storage controlling apparatus, and a bridge module for connecting said interface module and said management module to each other so that data can be transferred between said interface module and said management module, said interface module comprising:

a first transfer processing unit for controlling data transfer between said interface module and said disk unit or said host a second transfer processing unit for controlling data transfer between said interface module and said bridge module;

said two transfer processing units being connected to each other in at least two different modes through an interface bus so that data can be transferred between said two transfer processing units;

a determining means for determining whether or not a basic mode predetermined to be one of said at least two different modes agrees with a mode set in a mode setting sequence executed when said interface module is reset or when data is transferred between said two transfer processing units;

a notifying means for determining that transfer mode abnormality occurs when said determining means determines that said modes do not agree with each other, and for sending an error notice, and a controlling means for rerunning said mode setting sequence when receiving said error notice from said notifying means.

14. The interface module for a storage controlling apparatus according to claim 13, wherein when said determining means again determines that said modes do not agree with each other after said controlling means reruns said mode setting sequence, said notifying means determines that a failure occurs, and sends a failure notice.

15. The interface module for a storage controlling apparatus according to claim 14, wherein said interface bus is a PCI (Peripheral Component Interconnect) bus.

16. The interface module for a storage controlling apparatus according to claim 15, wherein said interface bus is a 64-bit PCI bus, said at least two different modes are a 64-bit transfer mode and a 32-bit transfer mode, said basic mode is said 64-bit transfer mode; and when said determining means determines that said modes do not agree with each other, said notifying means determines that an inefficient transfer status occurs as said transfer mode abnormality, and sends said error notice.

17. The interface module for a storage controlling apparatus according to claim 13, wherein said interface bus is a PCI (Peripheral Component Interconnect) bus.

18. The interface module for a storage controlling apparatus according to claim 17, wherein said interface bus is a 64-bit PCI bus, said at least two different modes are a 64-bit transfer mode and a 32-bit transfer mode, said basic mode is said 64-bit transfer mode; and when said determining means determines that said modes do not agree with each other, said notifying means determines that an inefficient transfer status occurs as said transfer mode abnormality, and sends said error notice.

* * * * *

UNITED STATES PATENT AND TRADEMARK OFFICE
CERTIFICATE OF CORRECTION

PATENT NO. : 7,343,522 B2 Page 1 of 1
APPLICATION NO. : 10/781657
DATED : March 11, 2008
INVENTOR(S) : Takanori Ishii It is certified that error appears in the above-identified patent and that said Letters Patent is hereby corrected as shown below:

Col. 13, line 3, delete "hose" and insert --host--, therefor.

Col. 13, line 11, delete "of" and insert --or--, therefor.

Col. 14, line 7, after "host" insert --;--.

Signed and Sealed this

Twenty-ninth Day of July, 2008

JON W. DUDAS
*Director of the United States Patent and Trademark Office*